US012804544B2

(12) United States Patent
Yang

(10) Patent No.: US 12,804,544 B2
(45) **Date of Patent: *Nov. 17, 2026**

(54) DATA TRANSMISSION METHOD, ACCESS NETWORK APPARATUS, AND TERMINAL APPARATUS

(71) Applicant: KONINKLIJKE PHILIPS N.V., Eindhoven (NL)

(72) Inventor: Ning Yang, Dongguan (CN)

(73) Assignee: Koninklijke Philips N.V., Eindhoven (NL)

( * ) Notice: Subject to any disclaimer, the term of this patent is extended or adjusted under 35 U.S.C. 154(b) by 102 days.

This patent is subject to a terminal disclaimer.

(21) Appl. No.: 18/638,938

(22) Filed: Apr. 18, 2024

(65) Prior Publication Data

US 2024/0267845 A1 Aug. 8, 2024

Related U.S. Application Data

(63) Continuation of application No. 17/006,435, filed on Aug. 28, 2020, now Pat. No. 12,022,389, which is a (Continued)

(51) Int. Cl.
*H04W 52/02* (2009.01)
*H04L 12/46* (2006.01)
(Continued)

(52) U.S. Cl.
CPC ..... *H04W 52/0222* (2013.01); *H04L 12/4633* (2013.01); *H04L 49/9057* (2013.01); (Continued)

(58) Field of Classification Search
CPC ....... H04W 52/0222; H04W 36/00837; H04W 36/324; H04W 36/0033; H04W 36/08; (Continued)

(56) References Cited

U.S. PATENT DOCUMENTS 6,195,551 B1 * 2/2001 Kim ...................... H04W 48/20
2002/0006805 A1 * 1/2002 New ..................... H04W 48/16
(Continued)

FOREIGN PATENT DOCUMENTS

CN 101047427 A 10/2007
CN 102413534 A 4/2012
(Continued)

OTHER PUBLICATIONS

Indian Hearing Notice for IN Application 201817049403 mailed Dec. 6, 2023. (3 pages).
(Continued)

*Primary Examiner* — Ronald B Abelson

(57) ABSTRACT

Implementations of the present disclosure provide a method for transmitting data, an access network device and a terminal device. The method includes the following steps: an access network device receives a first data packet sent by a core network device, and determines a state that the terminal device needs to be in for receiving the first data packet, the state that the terminal device needs to be in for receiving the first data packet is any of at least two states, and the at least two states are different states when the terminal device is in data transmission with a network side device; the access network device sends the data packet to the terminal device. The implementations of the invention can enable the terminal device to transmit the data packet in a state matched with the data packet.

18 Claims, 3 Drawing Sheets

Related U.S. Application Data continuation of application No. 16/311,994, filed as application No. PCT/CN2016/098923 on Sep. 13, 2016, now Pat. No. 10,805,881.

(51) Int. Cl.

| | |
|---|---|
| ***H04L 49/9057*** | (2022.01) |
| ***H04W 36/00*** | (2009.01) |
| ***H04W 36/08*** | (2009.01) |
| ***H04W 36/32*** | (2009.01) |
| ***H04W 76/00*** | (2018.01) |

(52) U.S. Cl.

CPC . *H04W 36/0033* (2013.01); *H04W 36/00837* (2018.08); *H04W 36/08* (2013.01); *H04W 36/32* (2013.01); *H04W 36/324* (2023.05); *H04W 76/00* (2013.01); *Y02D 30/70* (2020.08)

(58) Field of Classification Search

CPC .. H04W 36/32; H04W 76/00; H04L 12/4633; H04L 49/9057

See application file for complete search history.

(56) References Cited

U.S. PATENT DOCUMENTS

| | | | | |
|---|---|---|---|---|
| 2008/0225801 | A1* | 9/2008 | Turk | H04W 36/24 |
| 2011/0117916 | A1* | 5/2011 | Dahlen | H04W 48/08 |
| 2015/0195751 | A1 | 7/2015 | Ioyagi et al. | |
| 2019/0223151 | A1* | 7/2019 | Li | H04W 76/11 |
| 2019/0297654 | A1* | 9/2019 | Chen | H04L 1/1685 |

FOREIGN PATENT DOCUMENTS

| | | | |
|---|---|---|---|
| CN | 102761942 | A | 10/2012 |
| CN | 103168490 | A | 6/2013 |
| CN | 03338500 | A | 10/2013 |
| CN | 103763748 | A | 4/2014 |
| CN | 105580429 | A | 5/2016 |
| CN | 05723779 | A | 6/2016 |
| CN | 105848223 | A | 8/2016 |
| JP | 007522763 | A | 8/2007 |
| JP | 2007522763 | A | 8/2007 |
| JP | 013518476 | A | 5/2013 |
| JP | 2013518476 | | 5/2013 |

OTHER PUBLICATIONS

Chinese First Office Action with English Translation for CN Application 202110002189.8 mailed Dec. 5, 2022. X 16 pages).

Japanese Decision of Refusal with English Translation for JP Application 2018567131 mailed Jul. 2, 2021. (4 pages).

3GPP TS 38.331 V15.0.0 (Dec. 2017); 3rd Generation Partnership Project; Technical Specification Group Radio Access Network; NR; Radio Resource Control (RRC) protocol Specification.

3GPP TS 25.331 V10.9.0 (Sep. 2012); 3rd Generation Partnership Project; Technical Specification Group Radio Access Network; Radio Resource Control (RRC) protocol Specification.

3GPP TR 23.887 V12.0.0 (Dec. 2013); 3rd Generation Partnership Project; Technical Specification Group Services and System Aspects; Study on Machine-Type Communications (MTG) and other mobile data applications communications enhancements (Release 12).

Search Report from EP Application No. 16915955.5 dated Jul. 11, 2019.

English translation of CN OA for CN application No. 201680087140.1 mailed Apr. 28, 2020.

India Office Action for IN Application 201817049403 mailed Aug. 10, 2020.

International Search Report for PCT/CN2016/098923 mailed Apr. 28, 2017.

Communication pursuant to Article 94(3) EPC for EP Application 16915955.5 mailed Apr. 28, 2021. (7 pages).

Taiwan Office Action with English Translation for TW Application 106129744 mailed Feb. 26, 2021. (10 pages).

IrSG-RAN Working Group 2 {Radio layer 2 and Radio Layer 3); Sophia Antipolis, Aug. 16-20, 1999; TSGR2#6{99) 607.

Japan First Office Action with English Translation for JP Application 2018-567131 mailed Oct. 23, 2020.

Chinese First Office Action with English Translation for CN Application 202110002189.8 mailed Dec. 5, 2022. 16 pages).

* cited by examiner

DATA TRANSMISSION METHOD, ACCESS NETWORK APPARATUS, AND TERMINAL APPARATUS

CROSS-REFERENCE TO RELATED APPLICATION(S)

This application is a continuation of U.S. patent application Ser. No. 17/006,435, filed on Aug. 28, 2020, which is a continuation of U.S. Pat. No. 10,805,881, filed on Dec. 20, 2018, which is the U.S. National Phase application under 35 U.S.C. § 371 of International Application No. PCT/CN2016/098923, filed on Sep. 13, 2016. These applications are hereby incorporated by reference herein.

TECHNICAL FIELD

The present disclosure relates to the communication field, and more particularly, to a method for transmitting data, an access network device and a terminal device.

BACKGROUND

In a wireless communication system, a terminal device has two basic modes: one is an idle mode (i.e. standby mode) and the other is a connection mode. When the terminal device is in the connection mode, there is a radio resource control (RRC) connection between the terminal device and an evolved Universal Terrestrial Radio Access Network (UTRAN).

In a scenario where the terminal device is in the idle mode, if the terminal device needs to receive or send data, the terminal device needs to switch from the idle mode to the connection mode, and then to perform data transmission. When the data transmission is ended, the terminal device may switch from the connection mode to the idle mode again. However, frequent switching of the terminal device between the idle mode and the connection mode will increase the signaling overhead of the terminal device, and eventually increase the power consumption of the terminal device.

SUMMARY

The present disclosure provides a method for transmitting data, an access network device and a terminal device.

In a first aspect, a method for transmitting data is provided. The method includes: an access network device receives a first data packet sent by a core network device, and determines a state that a terminal device needs to be in for receiving the first data packet. The state that the terminal device needs to be in for receiving the first data packet is any one of at least two states, and the at least two states are different states when the terminal device is in data transmission with a network side device. The access network device sends the first data packet to the terminal device.

The access network device determines the state that the terminal device needs to be in for receiving the first data packet, so that the terminal device can receive the first data packet in a state matched with the first data packet.

Specifically, if the first data packet is relatively small, the access network device may determine that the terminal device receives the first data packet in a first state (the first state may be an inactive state), and if the first data packet is relatively large, the access network device may determine that the terminal device receives the first data packet in a second state (the second state may be an active state). In combination with the first aspect, in a first implementation of the first aspect, the at least two states include a first state and a second state. In the first state, the terminal device and the access network device keep connected, the terminal device and the access network device store context information of the terminal device, and when the terminal device moves within coverage ranges of all access network devices in an access network device set to which the access network device belongs, the terminal device performs a cell reselection process, and does not perform handover between access network devices. In the second state, when the terminal device moves within the coverage ranges of all access network devices in the access network device set to which the access network device belongs, the access network device controls the terminal device to perform handover between access network devices.

In combination with the first aspect or the first implementation of the first aspect, in a second implementation of the first aspect, the method further includes: the access network device acquires information of a bearer corresponding to the first data packet or information of a data stream corresponding to the first data packet from the core network device. Determining by the access network device the state that the terminal device needs to be in for receiving the first data packet includes: the access network device determines the state that the terminal device needs to be in for receiving the first data packet according to the information of the bearer or the information of the data stream. The information of the bearer or the information of the data stream may be the configuration information when the core network establishes the bearer or the data stream, or may be some attribute information of the bearer or the data stream per se. The attribute information may include information of quality of service (QOS) of the bearer or information of (QoS) of the data stream.

In combination with the second implementation of the first aspect, in a third implementation of the first aspect, acquiring by the access network device the information of the bearer corresponding to the first data packet or the information of the data stream corresponding to the first data packet from the core network device includes: the access network device acquires a first indication information of the bearer or the data stream, and the first indication information is used to indicate the state that the terminal device needs to be in when the data packet corresponding to the bearer or the data stream is transmitted. Determining by the access network device the state that the terminal device needs to be in for receiving the first data packet according to the information of the bearer or the information of the data stream includes: the access network device determines the state that the terminal device needs to be in for receiving the first data packet according to the first indication information.

The state that the terminal device needs to be in for receiving the first data packet is directly indicated by the first indication information, so that the access network device can directly determine the state that the terminal device needs to be in for receiving the data packet according to the first indication information after acquiring the first indication information, and the data transmission can be better performed. It should be understood that the first indication information may be carried in the configuration information of the bearer or the data stream.

In combination with the second implementation of the first aspect, in a fourth implementation of the first aspect, acquiring by the access network device the information of the bearer corresponding to the first data packet or the information of the data stream corresponding to the first data packet from the core network device includes: the access network device acquires attribute information of the bearer corresponding to the first data packet or attribute information of the data stream corresponding to the first data packet from the core network device. Determining by the access network device the state that the terminal device needs to be in for receiving the first data packet according to the information of bearer or information of data stream includes: the access network device determines the state that the terminal device needs to be in for receiving the first data packet according to the attribute information of the bearer or the attribute information of the data stream.

In addition to the manner that the access network may directly determine the state that the terminal device needs to be in for receiving the first data packet according to the first indication information, the access network device may determine the state that the terminal device needs to be in for receiving the first data packet according to the attribute information of the bearer corresponding to the first data packet or the attribute information of the data stream corresponding to the first data packet.

In combination with the fourth implementation of the first aspect, in a fifth implementation of the first aspect, determining by the access network device the state that the terminal device needs to be in for receiving the first data packet according to the attribute information of the bearer or the attribute information of the data stream includes: the access network device determines the state that the terminal device needs to be in for receiving the first data packet according to at least one of data delay, a size of the data packet, and a sending time interval of the data packet.

In combination with the first implementation of the first aspect or the first aspect, in a sixth implementation of the first aspect, the method further includes: the access network device acquires second indication information from the core network device, and the second indication information is used to indicate the state that the terminal device needs to be in for receiving the first data packet. Determining by the access network device the state that the terminal device needs to be in for receiving the first data packet includes: the access network device determines the state that the terminal device needs to be in for receiving the first data packet according to the second indication information.

It should be understood that the access network device not only can determine the state that the terminal device needs to be in for receiving the data packet according to the information of the bearer corresponding to the first data packet or the information of the data stream corresponding to the first data packet, but also can determine the state that the terminal device needs to be in for receiving the first data packet according to the separate second indication information directly received from the core network device.

The second indication information may be information sent by the core network device before sending the first data packet to the access network device.

In combination with the first aspect or the first implementation of the first aspect, in a seventh implementation of the first aspect, the first data packet carries third indication information of the first data packet, the third indication information is used to indicate the state that the terminal device needs to be in for receiving the first data packet. And the method further includes: the access network device acquires the third indication information of the first data packet from the first data packet. Determining by the access network device the state that the terminal device needs to be in for receiving the first data packet includes: the access network device determines the state that the terminal device needs to be in for receiving the first data packet according to the third indication information.

The third indication information is carried in the first data packet. The second indication information may be separate information sent by the core network device to the access network device. The first indication information may be carried in configuration information of the bearer or the data stream corresponding to the first data packet.

In combination with the seventh implementation of the first aspect, in an eighth implementation of the first aspect, the third indication information is carried in a General Packet Radio Service (GPRS) Tunnelling Protocol for the Userplane (GTP-U) header field of the first data packet.

In combination with the first aspect or the first implementation of the first aspect, in a ninth implementation of the first aspect, determining by the access network device the state that the terminal device needs to be in for receiving the first data packet includes: the access network device determines the state that the terminal device needs to be in for receiving the first data packet according to fourth indication information of the first data packet carried in a second data packet, wherein the fourth indication information of the first data packet is used to indicate the state that the terminal device needs to be in for receiving the first data packet, and the second data packet is a data packet received by the access network device before receiving the first data packet.

The fourth indication information of the first data packet may be carried in another data packet, so that the access network device may acquire the fourth indication information of the first data packet from the another data packet.

In combination with the ninth implementation of the first aspect, in a tenth implementation of the first aspect, the second data packet carries fourth indication information of N data packets starting from the second data packet, and the N data packets include the second data packet and the first data packet, N is an integer greater than 1.

Optionally, the access network device sends the second data packet to the terminal device, so that the terminal device determines the state that the terminal device needs to be in for receiving the first data packet according to the fourth indication information of the N data packets carried in the second data packet.

Specifically, after receiving the second data packet of the access network device, the terminal device may acquire the fourth indication information of the first data packet from the fourth indication information of N data packets carried in the second data packet, so that the state that the terminal device needs to be in for receiving the first data packet nay be determined according to the fourth indication information of the first data packet.

In combination with the ninth implementation of the first aspect, in an eleventh implementation of the first aspect, the second data packet carries fourth indication information of a plurality of data packets starting from the second data packet to a data packet of which a sequence number is N, and the plurality of data packets includes the second data packet and the first data packet, N is an integer greater than 1.

Optionally, the access network device sends the second data packet to the terminal device, so that the terminal device determines the state that the terminal device needs to be in for receiving the first data packet according to the fourth indication information of the plurality of data packets carried in the second data packet.

Specifically, after receiving the second data packet of the access network device, the terminal device may acquire the fourth indication information of the first data packet from the fourth indication information of the plurality of data packets carried in the second data packet, so that the terminal device can determine the state that the terminal device needs to be in for receiving the first data packet according to the fourth indication information of the first data packet.

In combination with any of the ninth to eleventh implementations of the first aspect, in a twelfth implementation of the first aspect, the fourth indication information is carried in a GTP-U header field of the second data packet.

In combination with any one of the first aspect and the first to twelfth implementations of the first aspect, in a thirteenth implementation of the first aspect, the method further includes: the access network device sends fifth indication information to the terminal device, and the fifth indication information is used to indicate the state that the terminal device needs to be in for receiving the first data packet.

The access network device notifies the terminal device through the fifth indication information so that the terminal device can receive the data packet in a corresponding state.

The access network device may send the fifth indication information to the terminal device before sending the data packet to the terminal device, or the access network device may send the fifth indication information to the terminal device while sending the data packet.

In a second aspect, a method for transmitting data is provided. The method includes: a terminal device determines a state that the terminal device needs to be in for sending a data packet to an access network device. The state that the access network device needs to be in for sending the data packet to the access network device is any one of at least two states, and the at least two states are different states when the terminal device is in data transmission with a network side device. The terminal device sends the data packet to the access network device in the state that the terminal device needs to be in for sending the data packet.

In combination with the second aspect, in a first implementation of the second aspect, the at least two states include a first state and a second state. In the first state, the terminal device and the access network device keep connected, the terminal device and the access network device store context information of the terminal device, and when the terminal device moves within coverage ranges of all access network devices in an access network device set to which the access network device belongs, the terminal device performs a cell reselection process, and does not perform handover between access network devices. In the second state, when the terminal device moves within the coverage ranges of all access network devices in the access network device set to which the access network device belongs, the access network device controls the terminal device to perform handover between access network devices.

Specifically, if the data packet is relatively small, the terminal device may determine to send the data packet in the first state (the first state may be an inactive state), and if the data packet is relatively large, the terminal device may determine to send the data packet in the second state (the second state may be an active state).

In combination with the second aspect or the first implementation of the second aspect, in a second implementation of the second aspect, determining by the terminal device the state that the terminal device needs to be in for sending the data packet includes: the terminal device determines the state that the terminal device needs to be in for sending the data packet according to pre-acquired information of a bearer corresponding to the data packet or pre-acquired information of a data stream corresponding to the data packet.

The terminal device may acquire the information of the bearer corresponding to the data packet or the information of the data stream corresponding to the data packet in a process of interacting with the access network device or a core network device.

In combination with the second implementation of the second aspect, in a third implementation of the second aspect, determining by the terminal device the state that the terminal device needs to be in for sending the data packet according to the pre-acquired information of the bearer corresponding to the data packet or the pre-acquired information of the data stream corresponding to the data packet includes: the terminal device determines the state that the terminal device needs to be in for sending the data packet according to first indication information in configuration information of the bearer or the data stream, wherein the first indication information is used to indicate the state that the terminal device needs to be in when the data packet corresponding to the bearer or the data stream is transmitted.

The terminal device can directly determine the state that the terminal device needs to be in for sending the data packet through the pre-acquired first indication information.

In combination with the second implementation of the second aspect, in a fourth implementation of the second aspect, determining by the terminal device the state needed to be in for sending the data packet according to information of the bearer or information of the data stream that is configured previously includes: the terminal device determines the state needed to be in for sending the data packet according to attribute information of the bearer or attribute information of the data stream.

The terminal device may either directly determine the state that the terminal device needs to be in for sending the data packet according to the pre-acquired first indication information in the configuration information of the bearer or the data stream, or may determine the state that the terminal device needs to be in for sending the data packet according to the attribute information of the bearer corresponding to the data packet or the attribute information of the data stream corresponding to the data packet.

In combination with the fourth implementation of the second aspect, in a fifth implementation of the second aspect, determining by the terminal device the state needed to be in for sending the data packet according to the attribute information of the bearer or the attribute information of the data stream includes: the terminal device determines the state that the terminal device needs to be in for sending the data packet according to at least one of data delay, a size of the data packet, and a sending time interval of the data packet.

In a third aspect, an access network device is provided, which includes modules for performing the method of the first aspect.

In a fourth aspect, a terminal device is provided, which includes modules for performing the method of the second aspect.

In a fifth aspect, an access network device is provided, which includes a memory for storing programs, a transceiver, and a processor for executing the programs, and when executing the programs, the processor executes the method in the first aspect based on the transceiver.

In a sixth aspect, a terminal device is provided, which includes a memory for storing programs, a transceiver, and a processor for executing the programs, and when executing the programs, the processor executes the method in the second aspect based on the transceiver.

In a seventh aspect, a non-transitory computer readable medium is provided, which stores program codes for execution by a terminal device, wherein, the program codes includes instructions for executing the method in the first aspect.

In an eighth aspect, a non-transitory computer readable medium is provided, which stores program codes for execution by an access network device, wherein the program codes includes instructions for performing the method in the second aspect.

BRIEF DESCRIPTION OF DRAWINGS

In order to explain the technical schemes of the implementations of the present disclosure more clearly, the drawings that are referred to in the description of the implementations or the prior art will be briefly introduced below. Obviously, the drawings in the following description are only some implementations of the present disclosure. For those of ordinary skill in the art, other drawings can be obtained according to these drawings without an inventive effort.

DETAILED DESCRIPTION

Figure 1:
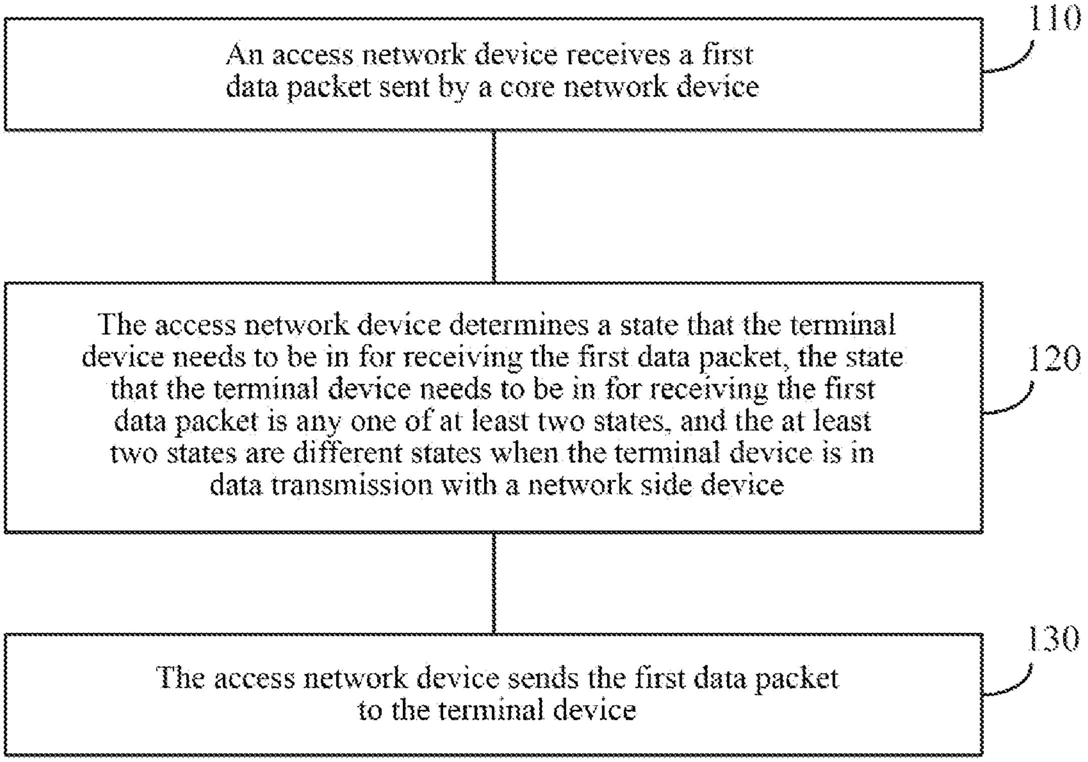
FIG. 1 is a schematic flowchart of a method for transmitting data according to an implementation of the present disclosure.

The technical solutions in the implementations of the present disclosure will be described clearly and completely in the following with reference to the drawings in the implementations of the present disclosure. Obviously, the described implementations are parts, but not all, of the implementations of the present disclosure. According to the implementations of the present disclosure, all other implementations obtained by a person of ordinary skill in the art without an inventive effort are within the protection scope of the present disclosure.

The technical solutions of the implementations of the present disclosure may be applied to various communication systems, such as, the Global System of Mobile communication (GSM) system, Code Division Multiple Access (CDMA) system, Wideband Code Division Multiple Access (WCDMA) system, General Packet Radio Service (GPRS) system, long term evolution (LTE) system, LTE Frequency Division Duplex (FDD) system, LTE Time Division Duplex (TDD) system, Universal Mobile Telecommunication System (UMTS) system or Worldwide Interoperability for Microwave Access (WiMAX) communication system and other communication systems which may possibly applied in the future.

In implementations of the present disclosure, the terminal device may be called a User Equipment (UE), terminal device, mobile station (MS), mobile terminal, or terminal device in a future 5G network, etc. The terminal device may communicate with one or more core networks via a radio access network (RAN). For example, the terminal device may be a mobile phone (or called "cellular" phone) or a computer with a mobile terminal, etc. For example, the terminal device may be a portable mobile apparatus, pocket-sized mobile apparatus, handheld mobile apparatus, mobile apparatus with built-in computer or vehicle-bone mobile apparatus, and mobile devices exchange voice and/or data with the RAN.

The access network device in the implementations of the present disclosure can communicate with the mobile device. The access network device may be a base transceiver station (BTS) in the Global System of Mobile communication (GSM) or Code Division Multiple Access (CDMA), or a NodeB (NB) in Wideband Code Division Multiple Access (WCDMA), or an Evolutional Node B (eNB or eNodeB) in long term evolution (LTE), or a relay station or access node, or a vehicle-bone device, a wearable device, or an access network device in the future 5G network.

The core network device may be a Mobility Management Entity (MME), a Serving Gateway (S-GW), or a Packet Data Gateway (P-GW), which is not restricted in the present disclosure.

In order to better understand the implementations of the present disclosure, the idle mode and the connection mode of the terminal device will be described firstly.

The Idle mode has only one idle state. In the Idle state, all connections of the UE are closed at the access layer. In the UTRAN, a context is not established for the UE in the idle mode. If a specific UE is to be addressed, a paging message can be sent to all UEs in one cell or to multiple UEs listening a same paging period.

In the connection mode, there are four connection states: a cell paging channel (Cell-PCH) state, a UTRAN registration area paging channel (URA-PCH) state, a cell forward access channel (Cell-FACH) state and a cell dedicated channel (Cell-DCH) state. Among them, Cell-DCH is a connection mode for high-layer signaling connection, which may also be called "active state".

FIG. 1 is a schematic flowchart of a method for transmitting data according to an implementation of the present disclosure. The method shown in FIG. 1 includes acts 110 and 120.

In 110, an access network device receives a first data packet sent by a core network device.

The first data packet may be a data packet in downlink data sent by the core network device to a terminal device.

In 120, the access network device determines a state that the terminal device needs to be in for receiving the first data packet, and the state that the terminal device needs to be in for receiving the first data packet is any one of at least two states, and the at least two states are different states when the terminal device is in data transmission with a network side device.

It should be understood that, the at least two states may be two states when the terminal device in the connection mode performs data transmission with the network side. Specifically, the at least two states may be different states when the terminal device is in a radio resource control (RRC) connection with the network side device.

Optionally, the at least two states include a first state and a second state. The first state and the second state are two different states of the terminal device in the connection mode. In the first state, the terminal device and the access network device keep connected, and the terminal device and the access network device store context information of the terminal device, and when the terminal device moves within coverage ranges of all access network devices in an access network device set to which the access network device belongs, the terminal device performs a cell reselection process, and the terminal device does not perform handover between access network devices. In the second state, when the terminal device moves within the coverage ranges of all access network devices in the access network device set to which the access network device belongs, the access network device controls the terminal device to perform handover between access network devices.

That is, in the first state, the terminal device does not perform handover between access network devices, and all access network devices in the access network device set and the core network device cannot sense the movement of the terminal device. The movement of the terminal device is unknown to the network side device.

In the second state, when the terminal device moves from one cell to another, the access network device to which the terminal device belongs controls the terminal device to perform handover between the access network devices. In this case, the access network devices can sense the movement of the terminal device between the coverage ranges of different access network devices.

Specifically, the first state may be an inactive state and the second state may be an active state. Specific names of the first state and the second state are not restricted in the implementations of the present disclosure.

In 130, the access network device sends the first data packet to the terminal device.

In the implementation of the present disclosure, the access network device determines a state that the terminal device needs to be in for receiving the first data packet, so that the terminal device can receive the first data packet in a state matched with the first data packet.

Specifically, if the first data packet is relatively small (which means that the size of the data packet is relatively small), the access network device may determine that the terminal device receives the first data packet in the first state (the first state may be the inactive state), and if the first data packet is relatively large, the access network device may determine that the terminal device receives the first data packet in the second state (the second state may be the active state). However, in the prior art, it is not considered to adopt different states to receive data packets according to differences of the data packets. The method for transmitting data of the implementation of the present disclosure can determine which state the terminal device needs to be in for receiving the data packets, and thus can achieve better transmission of the data.

Optionally, in an implementation, determining by the access network device a state that the terminal device needs to be in for receiving the data packet includes: the access network device obtains auxiliary information of the core network device. The access network device determines a state required by the terminal device to receive the data packet according to the auxiliary information of the core network device.

The auxiliary information of the core network device may include information related to a bearer or a data stream established between the terminal device and the network side device. Specifically, the auxiliary information of the core network device may include information of the bearer and information of the data stream.

Optionally, in an implementation, determining by the access network device a state that the terminal device needs to be in for receiving the first data packet includes: the access network device obtains information of a bearer corresponding to the first data packet or information of a data stream corresponding to the first data packet, from the core network device. The access network device determines the state that the terminal device needs to be in for receiving the first data packet according to the information of the bearer corresponding to the first data packet or the information of the data stream corresponding to the first data packet.

The information of the bearer corresponding to the first data packet or information of the data stream corresponding to the first data packet may be information configured when the core network device establishes the bearer or the data stream.

Optionally, in an implementation, determining by the access network device a state that the terminal device needs to be in for receiving the first data packet includes: the access network device acquires first indication information of a bearer or a data stream, and the first indication information is used to indicate a state that the terminal device needs to be in for receiving the data packet corresponding to the bearer or the data stream. The access network device determines the state that the terminal device needs to be in for receiving the first data packet according to the first indication information.

It should be understood that the first indication information may be carried in an idle field in configuration information of the bearer or the data stream. In addition, the first indication information may indicate a state that the terminal device needs to be in for receiving a plurality of data packets corresponding to the bearer or the data stream, so that the terminal device can determine the state that the terminal device needs to be in for receiving the current data packet according to the first indication information.

Specifically, the configuration information of the bearer or the data stream may be used to directly indicate the state that the terminal device needs to be in for receiving the data packet, that is, when configuring the bearer or the data stream, the core network device has already determined the state that the terminal device needs to be in for receiving the data packet corresponding to the bearer or data stream, and carries the relevant indication information in the configuration information, so that the access network device can directly determine the state that the terminal device needs to be in for receiving the data packet according to the configuration information. It should be understood that the configuration information here may be information configured for the bearer or data stream by the core network device when the bearer or data stream is established, and the configuration information here may include attribute information of the bearer or data stream per se, such as a size of the data packet.

Optionally, in an implementation, determining by the access network device a state that the terminal device needs to be in for receiving the first data packet includes: the access network device acquires attribute information of a bearer or a data stream corresponding to the first data packet from the core network device. The access network device determines the state that the terminal device needs to be in for receiving the first data packet according to the attribute information of the bearer or the data stream.

It should be understood that the access network device may directly determine the state that the terminal device needs to be in for receiving the first data packet according to the first indication information contained in the configuration information of the bearer or the data stream, or it may determine the state that the terminal device needs to be in for receiving the first data packet according to some attribute information of the bearer or data stream per se. The attribute information may include information of quality of service (QOS) of the bearer or the data stream.

The attribute information of the bearer or the data stream may specifically include data delay information of the bearer or the data stream, a size of the data packet corresponding to the bearer or the data stream, a transmission time interval of the data packet corresponding to the bearer or the data stream, etc.

Specifically, determining by the access network device the state that the terminal device needs to be in for receiving the first data packet according to the attribute information of the bearer or data stream includes: the access network device determines the state that the terminal device needs to be in for receiving the first data packet according to at least one of data delay, a size of the data packet, and a transmission time interval of the data packet.

The access network device may determine the state that the terminal device needs to be in for receiving the first data packet according to one or more of the data delay, the size of the data packet, and the transmission time interval of the data packet.

For example, when data delay of a bearer or a data stream is relatively large, the access network device may determine that a state that the terminal device needs to be in for receiving the first data packet is an inactive state. When the data delay of the bearer or the data stream is relatively small, the access network device may determine that the state that the terminal device needs to be in for receiving the first data packet is an active state. That is, when the data delay exceeds a predetermined threshold, the access network device determines that the terminal device needs to be in an inactive state to receive the first data packet, and when the data delay is less than the predetermined threshold, the access network device determines that the terminal device needs to be in an active state to receive the first data packet.

When a size of the first data packet is relatively small, the access network device may determine that the state that the terminal device needs to be in for receiving the first data packet is an inactive state. When the size of the first data packet is relatively large, the access network device may determine that the state that the terminal device needs to be in for receiving the first data packet is an active state. Specifically, when the size of the first data packet is less than a predetermined threshold, the access network device determines that the terminal device needs to be in an inactive state to receive the first data packet, and when the size of the first data packet is greater than the predetermined threshold, the access network device determines that the terminal device needs to be in an active state to receive the first data packet.

When a transmission time interval or an arrival time interval of the first data packet is relatively long, the access network device may determine that the state that the terminal device needs to be in for receiving the first data packet is an inactive state, while when the transmission time interval or the arrival time interval of the first data packet is relatively short, the access network device may determine that the state that the terminal device needs to be in for receiving the first data packet is an active state. Specifically, when the transmission time interval of the first data packet exceeds a predetermined threshold, the access network device determines that the terminal device needs to be in an inactive state to receive the first data packet, and when the transmission time interval of the first data packet is less than the predetermined threshold, the access network device determines that the terminal device needs to be in an active state to receive the first data packet.

It should be understood that the access network device may determine the state that the terminal device needs to be in for receiving the first data packet according to multiple factors out of the data delay, the size of the data packet, and the transmission time interval of the data packet.

Optionally, in an implementation, determining by the access network device the state that the terminal device needs to be in for receiving the first data packet includes: the access network device acquires second indication information from the core network device, the second indication information is used to indicate the state that the terminal device needs to be in for receiving the first data packet. The access network device determines the state that the terminal device needs to be in for receiving the first data packet according to the second indication information.

The second indication information may be information sent by the core network device before sending the first data packet to the access network device.

The core network device may send the second indication information to the access network device before data is sent to the terminal device, so that the access network device may directly determine the state needed to be in for receiving the first data packet according to the second indication information. Next, the core network device sends the first data packet to the access network device, and the access network device sends the first data packet to the terminal device after receiving the first data packet.

In addition, besides sending separate indication information (the second indication information) to indicate the state that the terminal device needs to be in when the data packet is transmitted, the core network device may otherwise carry similar indication information in the data packet sent by the core network device to the access network device.

Optionally, in an implementation, the first data packet carries third indication information of the first data packet, and the third indication information is used to indicate the state that the terminal device needs to be in for receiving the first data packet. Next, the access network device acquires the third indication information of the first data packet from the first data packet. According to the third indication information, the terminal device determines the state that the terminal device needs to be in for receiving the first data packet.

It should be understood that the first data packet may also carry third indication information of other data packets, so that the access network device or the terminal device may determine the state that the terminal device needs to be in for receiving the other data packets according to the third indication information of the other data packets carried in the first data packet.

Optionally, the third indication information may be carried in a user plane tunneling protocol (GPRS tunneling protocol for the userplane, GTP-U) header field of the first data packet.

Optionally, in an implementation, determining by the access network device the state that the terminal device needs to be in for receiving the first data packet includes: the access network device determines the state that the terminal device needs to be in for receiving the first data packet according to fourth indication information of the first data packet carried in a second data packet, and the fourth indication information of the first data packet is used to indicate the state that the terminal device needs to be in for receiving the first data packet, and the second data packet is a data packet received by the access network device before receiving the first data packet.

That is, when determining the state that the terminal device needs to be in for receiving the first data packet, the access network device may determine the state that the terminal device needs to be in for receiving the first data packet according to the third indication information of the first data packet carried in the first data packet itself or the fourth indication information of the first data packet carried in another data packet.

Optionally, the second data packet may carry fourth indication information of a plurality of data packets including the first data packet, which may specifically include the following two situations.

(1) The second data packet carries fourth indication information of N data packets starting from the second data packet, and the N data packets contain the second data packet and the first data packet, and N is an integer greater than 1.

(2) The second data packet carries fourth indication information of a plurality of data packets starting from the second data packet to a data packet of which a sequence number is N, and the plurality of data packets contains the second data packet and the first data packet, N is an integer greater than 1.

That is, the second data packet may carry not only the fourth indication information of the second data packet itself, but also fourth indication information of other data packets.

Optionally, the access network device may send the second data packet to the terminal device so that the terminal device may determine the state that the terminal device needs to be in for receiving the first data packet according to the fourth indication information of N data packets carried in the second data packet, or, so that the terminal device can determine the state that the terminal device needs to be in for receiving the first data packet according to the fourth indication information of the plurality of data packets carried in the second data packet.

Specifically, after receiving the second data packet sent by the access network device, the terminal device may acquire the fourth indication information of the first data packet from the fourth indication information of the N data packets or the plurality of data packets carried in the second data packet, so that the state that the terminal device needs to be in for receiving the first data packet may be determined according to the fourth indication information of the first data packet.

It should be understood that the access network device may send the second data packet to the terminal device before sending the first data packet to the terminal device.

Optionally, in the second data packet, the fourth indication information of the plurality of data packets may be carried in the GTP-U header field of the second data packet.

Specifically, as shown in Table 1, a Data State field may be added into the GTP-U header field of the first data packet, and the Data State field carries the third indication information of the first data packet. In this way, after receiving the data packet, the access network device may acquire the third indication information of the first data packet by analyzing the first data packet, and then may determine the state that the terminal device needs to be in for receiving the first data packet according to the third indication information of the first data packet. It should be understood that the third indication information of other data packets may be also carried in the first data packet.

In addition, a Data State field may be added into the GTP-U header field of the second data packet. If the sequence number of the second data packet is 1, the Data State field of the second data packet may carry the fourth indication information of N data packets from the sequence number 1 to a sequence number N (N is an integer greater than 1), and the N data packets include the second data packet itself and the first data packet. If the sequence number of the second data packet is 3, the Data State field of the second data packet may carry the fourth indication information of a plurality of data packets from the sequence number 3 to a sequence number N (N is an integer greater than 3), and the plurality of data packets include the second data packet itself and the first data packet.

It should be understood that the third indication information of the first data packet carried in the first data packet has a same function as the fourth indication information of the first data packet carried in the second data packet, and both of the third indication of the first data packet and the fourth indication of the first data packet may be used to indicate the state that the terminal device needs to be in for receiving the first data packet. However, the third indication information of the first data packet is carried in the first data packet and the fourth indication information of the first data packet is carried in the second data packet.

TABLE 1

| GTP-U Header Field | | | | | | | | |
|---|---|---|---|---|---|---|---|---|
| Octets | 8 | 7 | 6 | 5 | 4 | 3 | 2 | 1 |
| 1 | Version | | | PT | (*) | E | S | PN |
| 2 | Message type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet)[1)4)] | | | | | | | |
| 10 | Sequence Number (2nd Octet)[1)4)] | | | | | | | |
| 11 | N-PDU[2)4)] Quantity | | | | | | | |
| 12 | Next Extension Header Type[3)4)] | | | | | | | |
| 13 | Data State | | | | | | | |

Optionally, before the access network device sends the first data packet to the terminal device, the access network device sends fifth indication information to the terminal device, which is used to indicate the state that the terminal device needs to be in for receiving the first data packet.

Specifically, assuming that the terminal device is currently in the first state, and the access network device determines a state that the terminal device needs to be in for receiving the first data packet is the first state, then the access network device may send the fifth indication information to the terminal device to inform the terminal device to receive the first data packet in the first state, or the access network device may directly send the first data packet to the terminal device without sending the fifth indication information to the terminal device.

However, if the terminal device is currently in the second state, the access network device may send the fifth indication information to the terminal device. After receiving the fifth indication information, the terminal device performs a series of interaction procedures with the access network device to switch from the second state to the first state, and then receives the first data packet sent by the access network device in the first state.

It should be understood that the fifth indication information may be a paging message, that is, the access network device may notify the terminal device of the state that the terminal device needs to be in for receiving the data packet by sending the paging message to the terminal device.

The method of transmitting data according to the implementation of the present disclosure has been described in detail above from the perspective of the access network device in conjunction with FIG. 1. A method for transmitting data according to an implementation of the present disclosure is described in detail below from the perspective of the terminal device in conjunction with FIG. 2.

Figure 2:
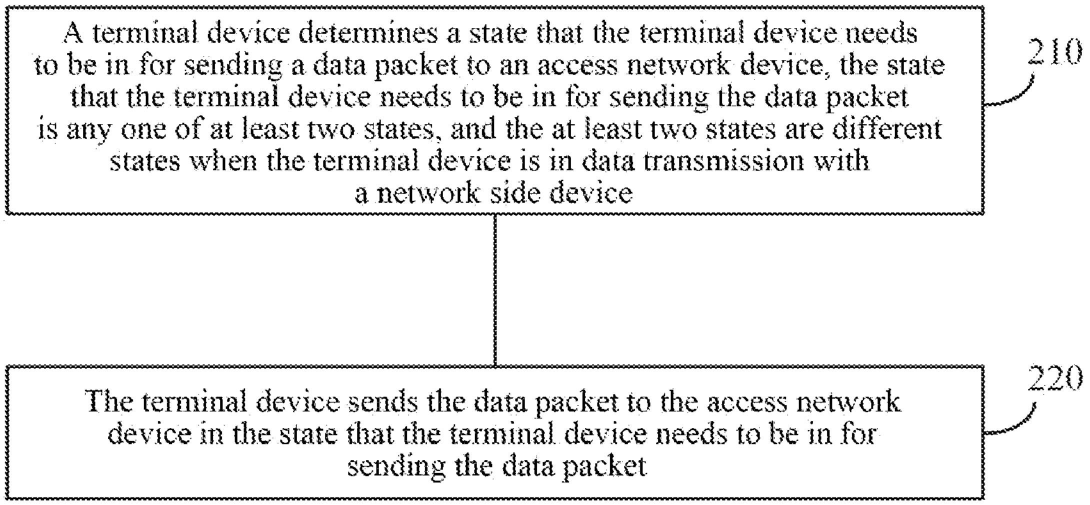
FIG. 2 is a schematic flowchart of a method for transmitting data according to an implementation of the present disclosure.

FIG. 2 is a schematic flowchart of a method for transmitting data according to an implementation of the present disclosure. The method of FIG. 2 includes acts 210 and 220.

In 210, a terminal device determines a state that the terminal device needs to be in for sending a data packet to an access network device. The state that the terminal device needs to be in for sending a data packet is any one of at least two states, and the at least two states are different states when the terminal device is in data transmission with a network side device.

The at least two states may be two states when the terminal device in the connection mode performs data transmission with the network side device. Specifically, the at least two states may be different states when the terminal device and the network side device are in an RRC connection.

Optionally, the at least two states include a first state and a second state, wherein the first state and the second state are two different states of the terminal device in the connection mode. In the first state, the terminal device and the access network device keep connected, and the terminal device and the access network device store context information of the terminal device, and when the terminal device moves within coverage ranges of all access network devices in an access network device set to which the access network device belongs, the terminal device performs a cell reselection process, and does not perform handover between access network devices. In the second state, when the terminal device moves within the coverage ranges of all access network devices in the access network device set to which the access network device belongs, the access network device controls the terminal device to perform handover between access network devices.

That is, in the first state, the terminal device does not perform handover between access network devices, and all access network devices in the access network device set and the core network device cannot sense the movement of the terminal device. The movement of the terminal device is unknown to the network side device. In the second state, when the terminal device moves from one cell to another cell, the access network device to which the terminal device belongs controls the terminal device to perform handover between the access network devices. In this case, the access network devices can sense the movement of the terminal device between the coverage ranges of different access network devices.

The first state may be an inactive state and the second state may be an active state.

In 220, the terminal device sends the data packet to the access network device in the state that the terminal device needs to be in for sending the data packet.

Specifically, assuming that a current state of the terminal device is the first state, the terminal device determines through act 210 that a state that the terminal device needs to be in for transmitting uplink data is the second state, the terminal device needs to switch from the current first state to the second state, and then the terminal device transmits the data packet in the second state. If the terminal device determines through act 210 that the state that the terminal device needs to be in for transmitting the uplink data is the first state, then the terminal device does not need to perform switching of states, and the terminal device transmits the data packet in the first state.

In the implementation of the disclosure, the terminal device determines the state needed to be in for sending the data packet before sending the data packet, so that the terminal device can send the data packet in a state matched with the data packet.

Specifically, if the data packet is relatively small, the terminal device may determine to send the data packet in the first state (the first state may be an inactive state), and if the data packet is relatively large, the terminal device may determine to send the data packet in the second state (the second state may be an active state). However, in the prior art, it is not considered to adopt corresponding states to transmit data packets according to differences of the data packets. The data transmission method of the implementation of the disclosure can select the state matched with the data packet to transmit the data packet, and thus the data transmission can be better performed.

Optionally, in an implementation, determining by the terminal device a state that the terminal device needs to be in for sending a data packet includes: the terminal device determines the state needed to be in for sending the data packet according to pre-acquired information of a bearer corresponding to the data packet or pre-acquired information of a data stream corresponding to the data packet.

The information of the bearer corresponding to the data packet or the information of the data stream corresponding to the data packet may be acquired by the terminal device previously from the access network device or from subscription information. Alternatively, the information of the bearer corresponding to the data packet or the information of the data stream corresponding to the data packet may be acquired by the terminal device from the core network device. When the terminal device needs to transmit uplink data, the state that the terminal needs to be in for sending uplink data to be transmitted may be determined according to the information of the bearer or the information of the data stream.

Optionally, in an implementation, determining by the terminal device the state that the terminal device needs to be in for sending the data packet according to the pre-acquired information of the bearer corresponding to the data packet or pre-acquired information of the data stream corresponding to the data packet includes: the terminal device determines the state that the terminal device needs to be in for sending the data packet according to first indication information in configuration information of the bearer or the data stream, the first indication information is used to indicate a state that the terminal device needs to be in when the data packet corresponding to the bearer or the data stream is transmitted.

Optionally, in an implementation, determining by the terminal device the state that the terminal device needs to be in for sending the data packet according to the pre-configured information of the bearer or pre-configured information of the data stream includes: the terminal device determines the state that the terminal device needs to be in for sending the data packet according to attribute information of the bearer or the data stream.

The attribute information may include information of quality of service (QOS) of the bearer or the data stream. The terminal device may directly determine the state that the terminal device needs to be in for receiving the data packet according to information contained in configuration information of the bearer or the data stream, or the terminal device may determine the state that the terminal device needs to be in for sending the data packet according to some attribute information of the bearer or the data stream per se.

The attribute information of the bearer or the data stream may specifically include data delay information of the bearer or the data stream, a size of the data packet corresponding to the bearer or the data stream, a transmission time interval of the data packet corresponding to the bearer or the data stream, etc.

The terminal device may directly determine the state that the terminal device needs to be in for sending the data packet according to the previously acquired first indication information, or the terminal device may determine the state that the terminal device needs to be in for sending the data packet through attribute information of the bearer per se corresponding to the data packet or attribute information of the data stream per se corresponding to the data packet.

Optionally, in an implementation, determining by the terminal device the state needed to be in for sending the data packet according to the attribute information of the bearer or the data stream includes: the terminal device determines the state that the terminal device needs to be in for sending the data packet according to at least one of data delay, a size of the data packet, and a sending time interval of the data packet.

Specifically, when the data delay of the bearer or the data stream exceeds a predetermined threshold, the terminal device may determine that the state that the terminal needs to be in for sending the data packet is an inactive state, while when the data delay of the bearer or the data stream is less than the predetermined threshold, the terminal device may determine that the state that the terminal need to be in for sending the data packet is an active state.

When the size of the data packet is smaller than a predetermined threshold, the terminal device may determine that the state that the terminal needs to be in for sending the data packet is an inactive state, and when the size of the data packet is greater than the predetermined threshold, the terminal device may determine that the state that the terminal needs to be in for sending the data packet is an active state.

When the sending time interval or an arrival time interval of the data packet exceeds a predetermined threshold, the terminal device may determine that the state that the terminal device needs to be in for sending the data packet is an inactive state, and when the sending time interval or the arrival time interval of the data packet is less than the predetermined threshold, the terminal device may determine that the state that the terminal device needs to be in for sending the data packet is an active state.

It should be understood that the terminal device may determine the state that the terminal needs to be in for sending the data packet according to multiple factors out of the data delay, the size of the data packet, and the sending time interval of the data packet.

Optionally, in an implementation, the terminal device is currently in the first state, and sending by the terminal device the data packet to the access network device in the state needed to be in for sending uplink data packets include: if the terminal device determines that the state the terminal device needs to be in for sending the data packet is the second state, the terminal device switches from the first state to the second state, and sends the data packet to the access network device in the second state.

For example, before sending the uplink data, the terminal device determines that the state that the terminal device needs to in for sending the uplink data is the active state, while the terminal device is currently in the inactive state, then the terminal device needs to switch from the inactive state to the active state, and then send the uplink data to the access network device in the active state. After sending the uplink data, the terminal device may continue to remain in the active state, or the terminal device may switch from the active state to the inactive state.

The methods for transmitting data according to the implementations of the present disclosure have been described in detail above with reference to FIGS. 1 and 2. An access network device and a terminal device according to implementations of the present disclosure will be described in detail below with reference to FIGS. 3-6. It should be understood that the access network device and the terminal device in FIGS. 3-6 can respectively perform the various acts of the access network device and the terminal device in the methods of transmitting data according to the implementations of the present disclosure, and to avoid repetition, they will not be described in detail herein.

Figure 3:
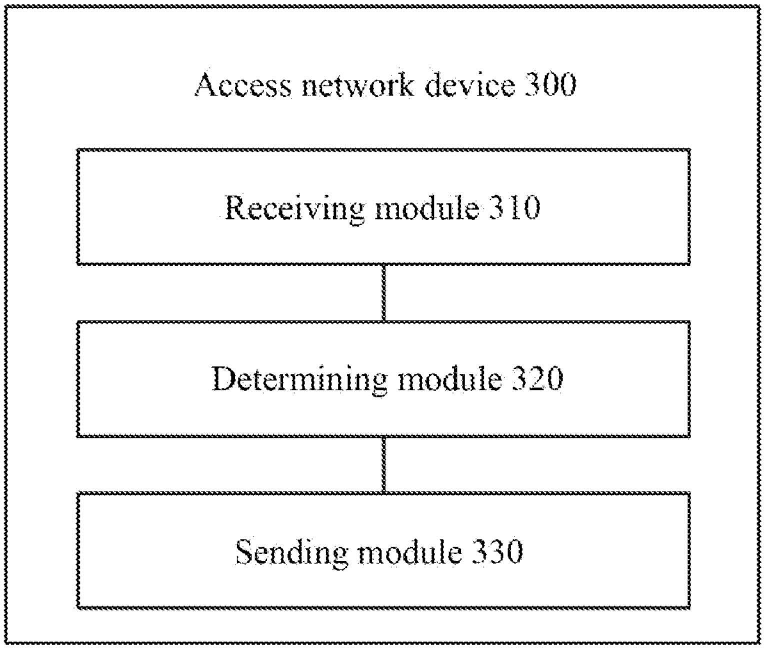
FIG. 3 is a block diagram of an access network device according to an implementation of the present disclosure.

FIG. 3 is a block diagram of an access network device according to an implementation of the present disclosure. As shown in FIG. 3, the access network device 300 includes a receiving module 310, a determining module 320 and a sending module 330.

The receiving module 310 is configured to receive a first data packet sent by a core network device.

The determining module 320 is configured to determine a state that a terminal device needs to be in for receiving the first data packet, wherein the state that the terminal device needs to be in for receiving the first data packet is any one of at least two states, and the at least two states are different states when the terminal device is in data transmission with a network side device.

The sending module 330 is configured to send the first data packet to the terminal device.

In the implementation of the present disclosure, the access network device determines the state that the terminal device needs to be in for receiving the first data packet, so that the terminal device can receive the first data packet in a state matched with the first data packet.

Specifically, if the first data packet is relatively small, the access network device may determine that the terminal device receives the first data packet in a first state (the first state may be an inactive state), and if the first data packet is relatively large, the access network device may determine that the terminal device receives the first data packet in a second state (the second state may be an active state). However, in the prior art, it is not considered to adopt corresponding states to receive data packets according to the differences of data packets. In the data transmission method of the implementation of the disclosure, the state matched with the data packet can be selected to receive the data packet, and thus the data transmission can be better performed.

Optionally, in an implementation, the at least two states include a first state and a second state. In the first state, the terminal device and the access network device keep connected, the terminal device and the access network device store context information of the terminal device, and when the terminal device moves within coverage ranges of all access network devices in an access network device set to which the access network device belongs, the terminal device performs a cell reselection process, and does not perform handover between access network devices. In the second state, when the terminal device moves within the coverage ranges of all access network devices in the access network device set to which the access network device belongs, the access network device controls the terminal device to perform handover between access network devices.

Optionally, in an implementation, the access network device further includes an acquisition module 340.

The acquisition module 340 is configured to acquire information of a bearer or data stream corresponding to the first data packet.

The determining module 320 is configured to determine the state that the terminal device needs to be in for receiving the first data packet according to the information of the bearer or the information of the data stream.

Optionally, in an implementation, the acquisition module 340 is specifically configured to acquire first indication information of a bearer or a data stream corresponding to the first data packet, and the first indication information is used to indicate a state that the terminal device needs to be in when the data packet corresponding to the bearer or data stream is transmitted.

The determining module 320 is specifically configured to determine a state that the terminal device needs to be in for receiving the first data packet according to the first indication information.

Optionally, in an implementation, the acquisition module 340 is specifically configured to: acquire attribute information of a bearer corresponding to the first data packet or attribute information of a data stream corresponding to the first data packet from the core network device.

The determining module 320 is specifically configured to determine the state that the terminal device needs to be in for receiving the first data packet according to the attribute information of the bearer or the attribute information of the data stream.

Optionally, in an implementation, the determining module 320 is specifically configured to determine the state that the terminal device needs to be in for receiving the first data packet according to at least one of data delay, a size of the data packet, and a sending time interval of the data packet.

Optionally, in an implementation, the access network device further includes an acquisition module 340.

The acquisition module 340 is configured to acquire second indication information from the core network device, the second indication information is used to indicate a state that the terminal device needs to be in for receiving the first data packet.

The determining module 320 is specifically configured to determine a state that the terminal device needs to be in for receiving the first data packet according to the second indication information.

Optionally, in an implementation, the first data packet carries third indication information of the first data packet, the third indication information is used to indicate a state that the terminal device needs to be in for receiving the first data packet, and the access network device further includes an acquisition module 340.

The acquisition module 340 is configured to acquire the third indication information of the first data packet from the first data packet.

The determining module 320 is specifically configured to determine a state that the terminal device needs to be in for receiving the first data packet according to the third indication information.

Optionally, in an implementation, the third indication information is carried in a GTP-U header field of the first data packet.

Optionally, in an implementation, the determining module 320 is specifically configured to determine the state that the terminal device needs to be in for receiving the first data packet according to fourth indication information of the first data packet carried in a second data packet, wherein the fourth indication information of the first data packet is used to indicate the state that the terminal device needs to be in for receiving the first data packet, and the second data packet is a data packet received by the access network device before receiving the first data packet.

Optionally, in an implementation, the second data packet carries fourth indication information of N data packets starting from the second data packet. The N data packets include the second data packet and the first data packet, and N is an integer greater than 1.

Optionally, in an implementation, the second data packet carries fourth indication information of a plurality of data packets starting from the second data packet to a data packet of which a sequence number is N. The plurality of data packets includes the second data packet and the first data packet, and N is an integer greater than 1.

Optionally, in an implementation, the fourth indication information is carried in a GTP-U header field of the second data packet.

Optionally, in an implementation, the sending module 330 is further configured to send fifth indication information to the terminal device. The fifth indication information is used to indicate a state that the terminal device needs to be in for receiving the first data packet.

Figure 4:
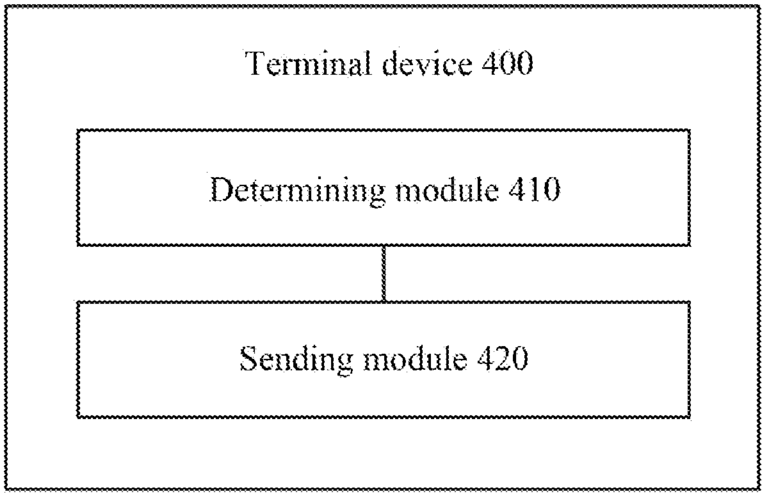
FIG. 4 is a block diagram of a terminal device according to an implementation of the present disclosure.

FIG. 4 is a block diagram of a terminal device according to an implementation of the present disclosure. As shown in FIG. 4, the terminal device 400 includes a determining module 410 and a sending module 420.

The determining module 410 is configured to determine a state that the terminal device needs to be in for sending a data packet to an access network device. The state that the terminal device needs to be in for sending a data packet is any one of at least two states, and the at least two states are different states when the terminal device is in data transmission with a network side device.

The sending module 420 is configured to send a first data packet to the access network device in a state needed to be in for sending the first data packet.

In the implementation of the disclosure, the terminal device determines the state needed to be in for sending the data packet before sending the data packet, so that the terminal device can send the data packet in a state matched with the data packet.

Optionally, in an implementation, the at least two states include a first state and a second state. In the first state, the terminal device and the access network device keep connected, the terminal device and the access network device store context information of the terminal device, and when the terminal device moves within coverage ranges of all access network devices in an access network device set to which the access network device belongs, the terminal device performs a cell reselection process, and does not perform handover between access network devices. In the second state, when the terminal device moves within the coverage ranges of all access network devices in the access network device set to which the access network device belongs, the access network device controls the terminal device to perform handover between access network devices.

Specifically, if the data packet is relatively small, the terminal device may determine to send the data packet in the first state (the first state may be an inactive state), and if the data packet is relatively large, the terminal device may determine to send the data packet in the second state (the second state may be an active state). However, in the prior art, it is not considered to adopt corresponding states to transmit data packets according to differences of data packets. In the data transmission method of the implementation of the present disclosure, the state matched with the data packet can be selected to transmit the data packet, and thus the data transmission can be better performed.

Optionally, in an implementation, the determining module 410 is specifically configured to determine the state needed to be in for sending the data packet according to pre-acquired information of a bearer corresponding to the data packet or pre-acquired information of a data stream corresponding to the data packet.

Optionally, in an implementation, the determining module 410 is specifically configured to determine the state that the terminal device needs to be in for sending the data packet according to first indication information in configuration information of the bearer or the data stream, wherein the first indication information is used to indicate a state that the terminal device needs to be in when the data packet corresponding to the bearer or the data stream is transmitted.

Optionally, in an implementation, the determining module 410 is specifically configured to determine the state needed to be in for sending the data packet according to attribute information of the bearer or the data stream.

Optionally, in an implementation, the determining module 410 is specifically configured to determine the state that the terminal device needs to be in for sending the first data packet according to at least one of data delay, a size of the data packet, and a sending time interval of the data packet.

Figure 5:
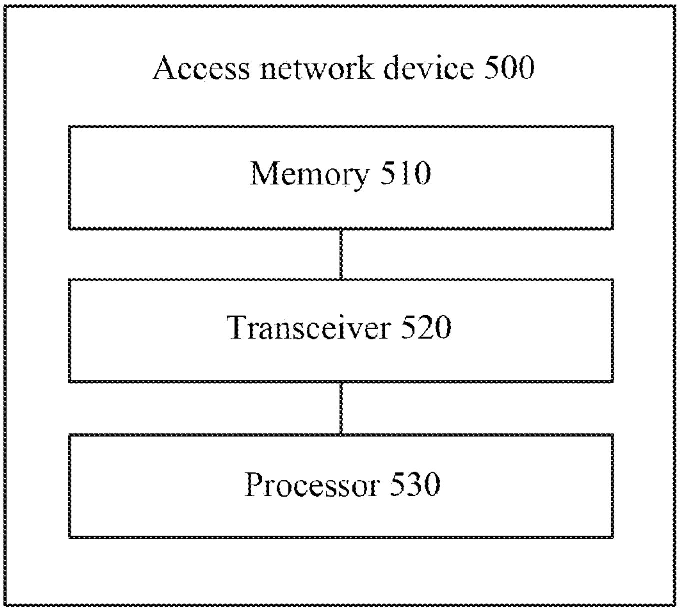
FIG. 5 is a block diagram of an access network device according to an implementation of the present disclosure.

FIG. 5 is a block diagram of an access network device according to an implementation of the present disclosure. The access network device 500 of FIG. 5 includes a memory 510, a transceiver 520, and a processor 530.

The memory 510 is configured store programs.

The transceiver 520 is configured to receive a first data packet sent by a core network device.

The processor 530 is configured to execute the programs stored in the memory 510, and when executing the programs, the processor 530 is configured to determine a state that a terminal device needs to be in for receiving the first data packet, wherein the state that the terminal device needs to be in for receiving the first data packet is any of at least two states, and the at least two states are different states when the terminal device is in data transmission with a network side device.

The transceiver 520 is further configured to send the first data packet to the terminal device.

In the implementation of the present disclosure, the access network device determines the state that the terminal device needs to be in for receiving the first data packet, so that the terminal device can receive the first data packet in a state matched with the first data packet.

Optionally, as an implementation, the at least two states include a first state and a second state. In the first state, the terminal device and the access network device keep connected, the terminal device and the access network device store context information of the terminal device, and when the terminal device moves within coverage ranges of all access network devices in an access network device set to which the access network device belongs, the terminal device performs a cell reselection process, and does not perform handover between access network devices. In the second state, when the terminal device moves within the coverage ranges of all access network devices in the access network device set to which the access network device belongs, the access network device controls the terminal device to perform handover between access network devices.

Optionally, in an implementation, the processor 530 is specifically configured to: acquire information of a bearer corresponding to the first data packet or information of a data stream corresponding to the first data packet, determine a state that the terminal device needs to be in for receiving the first data packet according to the information of the bearer or the information of the data stream.

Optionally, in an implementation, the processor 530 is specifically configured to acquire first indication information of a bearer corresponding to the first data packet or first indication information of a data stream corresponding to the first data packet, wherein the first indication information is used to indicate a state that the terminal device needs to be in when the data packet corresponding to the bearer or the data stream is transmitted, and determine the state that the terminal device needs to be in for receiving the first data packet according to the first indication information.

Optionally, in an implementation, the processor 530 is specifically configured to: acquire attribute information of the bearer corresponding to the first data packet or attribute information of the data stream corresponding to the first data packet from the core network device; determine the state that the terminal device needs to be in for receiving the first data packet according to the attribute information of the bearer or data stream.

Optionally, in an implementation, the processor 530 is specifically configured to determine the state that the terminal device needs to be in for receiving the first data packet according to at least one of data delay, a size of the data packet, and a sending time interval of the data packet.

Optionally, in an implementation, the transceiver 520 is specifically configured to receive second indication information sent by the core network device, wherein the second indication information is used to indicate a state that the terminal device needs to be in for receiving a current data packet. The processor 530 is specifically configured to determine the state that the terminal device needs to be in for receiving the first data packet according to the second indication information.

Optionally, in an implementation, the first data packet carries third indication information of the first data packet, and the third indication information is used to indicate a state that the terminal device needs to be in for receiving the first data packet. And the processor 530 is specifically configured to: acquire the third indication information of the first data packet from the first data packet; and determine a state that the terminal device needs to be in for receiving the first data packet according to the third indication information.

Optionally, in an implementation, the third indication information is carried in a GTP-U header field of the first data packet.

Optionally, in an implementation, the processor 530 is specifically configured to determine the state that the terminal device needs to be in for receiving the first data packet according to fourth indication information of the first data packet carried in a second data packet, wherein the fourth indication information of the first data packet is used to indicate a state that the terminal device needs to be in for receiving the first data packet, and the second data packet is a data packet received by the access network device before receiving the first data packet.

Optionally, in an implementation, the second data packet carries fourth indication information of N data packets starting from the second data packet. The N data packets include the second data packet and the first data packet, and Nis an integer greater than 1.

Optionally, in an implementation, the second data packet carries fourth indication information of a plurality of data packets starting from the second data packet to a data packet of which a sequence number is N. The plurality of data packets includes the second data packet and the first data packet, and N is an integer greater than 1.

Optionally, in an implementation, the fourth indication information is carried in a GTP-U header field of the second data packet.

Optionally, in an implementation, the transceiver 520 is further configured to send fifth indication information to the terminal device, wherein the fifth indication information is used to indicate a state that the terminal device needs to be in for receiving the first data packet.

Figure 6:
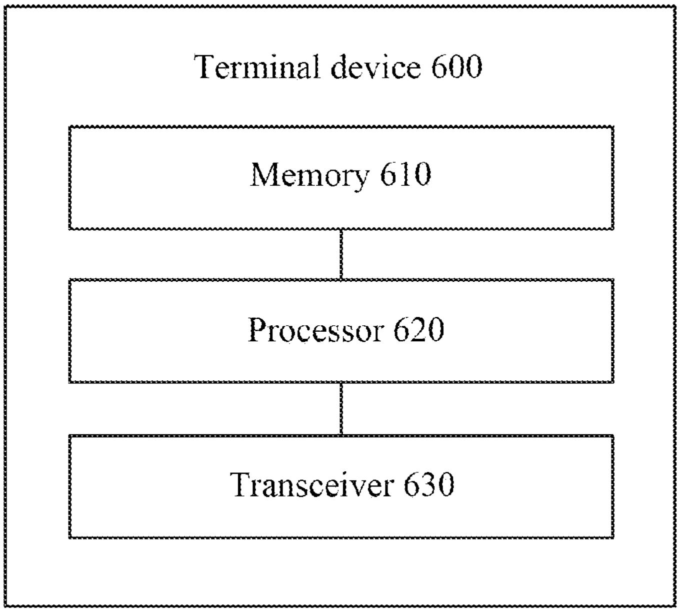
FIG. 6 is a block diagram of a terminal device according to an implementation of the present disclosure.

FIG. 6 is a schematic block diagram of a terminal device according to an implementation of the present disclosure. The terminal device 600 of FIG. 6 includes a memory 610, a processor 620, and a transceiver 630.

The memory 610 is configured to store programs.

The processor 620 is configured to execute the programs stored in the memory 610, and when executing the programs, the processor 620 is configured to determine a state that the terminal device needs to be in for sending a data packet to an access network device. The state that the terminal device needs to be in for sending a data packet is any one of at least two states, and the at least two states are different states when the terminal device is in data transmission with a network side device.

The transceiver 630 is configured to send the data packet to the access network device in a state needed to be in for sending the data packet.

In the implementation of the invention, the terminal device determines the state needed to be in for sending the data packet before sending the data packet, so that the terminal device can send the data packet in a state matched with the data packet.

Optionally, in an implementation, the at least two states include a first state and a second state. In the first state, the terminal device and the access network device keep connected, the terminal device and the access network device store context information of the terminal device, and when the terminal device moves within coverage ranges of all access network devices in an access network device set to which the access network device belongs, the terminal device performs a cell reselection process, and does not perform handover between access network devices. In the second state, when the terminal device moves within the coverage ranges of all access network devices in the access network device set to which the access network device belongs, the access network device controls the terminal device to perform handover between access network devices.

Optionally, in an implementation, the processor 620 is specifically configured to determine the state needed to be in for sending the data packet according to pre-acquired information of a bearer corresponding to the data packet or pre-acquired information of a data stream corresponding to the data packet.

Optionally, in an implementation, the processor 620 is specifically configured to determine the state that the terminal device needs to be in for sending the data packet according to first indication information in configuration information of the bearer or the data stream. The first indication information is used to indicate a state that the terminal device needs to be in when the data packet corresponding to the bearer or the data stream is transmitted.

Optionally, in an implementation, the processor 620 is specifically configured to determine the state needed to be in for sending the data packet according to attribute information of the bearer or the data stream.

Optionally, in an implementation, the processor 620 is specifically configured to determine the state that the terminal device needs to be in for sending the data packet according to at least one of data delay, a size of the data packet, and a sending time interval of the data packet.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present disclosure.

Those skilled in the art can clearly understand that for convenience and conciseness of description, the specific working processes of the system, device and unit described above may refer to the corresponding processes in the aforementioned method implementations and will not be described here.

In several implementations provided by the present disclosure, it should be understood that the disclosed systems, devices and methods may be implemented in other ways. For example, the device implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate unit may or may not be physically separated, and the unit shown as a unit may or may not be a physical unit, i.e., it may be located in one place or may be distributed over multiple network units. Some or all of the elements can be selected according to actual needs to achieve the purpose of the implementations.

In addition, various functional units in various implementations of the present disclosure may be integrated in one processing unit, or they may be physically present in each unit alone, or two or more units may be integrated in one unit.

The functions may be stored in a computer readable storage medium if implemented in the form of software functional units and sold or used as separate products. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present disclosure. The aforementioned storage media include U disk, mobile hard disk, read-only memory, random access memory, magnetic disk or optical disk, and other media capable of storing program codes.

What are described above are merely exemplary implementations of the present disclosure, but the protection scope of the present disclosure is not limited thereto. Any change or substation that can be easily conceived by a person skilled in the art within the technical scope disclosed by the present disclosure shall be included within the protection scope of the present disclosure. Therefore, the protection scope of the present disclosure shall be the protection scope defined by the claims.

What is claimed is:

1. A method of operating a first device comprising:
receiving a first data packet;
sending the first data packet to a second device; and
determining a state of the second device,
wherein the state is one of a first state and a second state,
wherein the first device is one of a plurality of first devices,
wherein the plurality of first devices comprises a third device,
wherein the second device and the first device are connected in the first state,
wherein the second device performs a cell reselection process in the first state when the second device moves within coverage range of at least one of the plurality of first devices,
wherein the second device does not perform a handover between first device and the third device in the first state; and
wherein the second device performs a handover between the first device and the third device in the second state when the second device moves within the coverage at least one of the plurality of first devices,
acquiring information of a bearer,
wherein the bearer corresponds to the first data packet or information of a data stream,
wherein the information of the data stream corresponds to the first data packet from a core network device,
wherein the determining is based on the information of the bearer or the information of the data stream.

2. The method of claim 1, wherein the second device and the first device store context information of the second device in the first state.

3. The method of claim 1,
wherein the acquiring comprises acquiring first indication information of the bearer or first indication information of the data stream,
wherein the first indication information of the bearer or first indication information of the data stream indicates the state when a data packet corresponding to the bearer or the data stream is transmitted,
wherein the determining is based on the first indication information of the bearer or first indication information of the data stream.

4. The method of claim 1,
wherein the acquiring comprises acquiring attribute information of the bearer corresponding to the first data packet or attribute information of the data stream corresponding to the first data packet from the core network device,
wherein the determining is based on the attribute information of the bearer or the attribute information of the data stream.

5. The method of claim 4, wherein the determining is based on at least one of data delay, a size of the first data packet, and a sending time interval of the first data packet.

6. A method of operating a first device comprising:
receiving a first data packet;
sending the first data packet to a second device; and
determining a state of the second device,
wherein the state is one of a first state and a second state,
wherein the first device is one of a plurality of first devices,
wherein the plurality of first devices comprises a third device,
wherein the second device and the first device are connected in the first state,
wherein the second device performs a cell reselection process in the first state when the second device moves within coverage range of at least one of the plurality of first devices,
wherein the second device does not perform a handover between first device and the third device in the first state; and
wherein the second device performs a handover between the first device and the third device in the second state when the second device moves within the coverage at least one of the plurality of first devices,
acquiring a second indication information,
wherein the determining is based on the second indication information.

7. The method of claim 6,
wherein the first data packet carries a third indication information,
wherein the acquiring comprises acquiring the third indication information,
wherein the determining is based on the third indication information.

8. The method of claim 7, wherein the third indication information is carried in a General Packet Radio Service (GPRS) Tunnelling Protocol for a Userplane (GTP-U) header field of the first data packet.

9. The method of claim 7,
wherein the determining is based on a fourth indication information of the first data packet,
wherein a second data packet comprises the fourth indication,
wherein the fourth indication information indicates the state of the second device when receiving the first data packet,
wherein the second data packet is received before the first data packet.

10. The method of claim 9,
wherein the fourth indication information is in each of N data packets excluding the first data packet,
wherein the N data packets comprise the second data packet and the first data packet,
wherein N is an integer greater than 1.

11. The method of claim 9,
wherein the second data packet carries fourth indication information of a plurality of data packets starting from the second data packet to a data packet of which has a sequence number N,
wherein the plurality of data packets comprises the second data packet and the first data packet,
wherein N is an integer greater than 1.

12. The method of claim 9, wherein the fourth indication information is carried in a General Packet Radio Service (GPRS) Tunnelling Protocol for a Userplane (GTP-U) header field of the second data packet.

13. The method of claim 9, wherein the method further comprises:

sending a fifth indication information to the second device, wherein the fifth indication information indicates the state of the second device during reception of the first data packet.

14. A method of transmitting data comprising:

determining a state of a second device, sending a data packet to a first device, wherein the state is one of a first state and a second state, wherein the first device is one of a plurality of first devices, wherein the plurality of first devices comprises a third device, wherein the second device and the first device are connected in the first state, wherein the second device performs a cell reselection process in the first state when the terminal device moves within coverage range of at least one of the plurality of first devices, wherein the second device does not perform a handover between first devices and the third device in the first state, wherein the second device performs a handover between the first device and the third device in the second state when the second device moves within the coverage at least one of the plurality of first devices, wherein the first device directs the second device to performs the handover between the first device and the third device, wherein the determining is based on pre-acquired information of a bearer, wherein the bearer corresponds to the first data packet or pre-acquired information of a data stream, wherein the pre-acquired information of the data stream corresponds to the data packet.

15. The method of claim 14, wherein the second device and the first device store context information of the second device in the first state.

16. The method of claim 14, wherein the determining based on the pre-acquired information of the bearer corresponding to the data packet or the pre-acquired information of the data stream corresponding to the data packet comprises:

determining based on a first indication information, wherein configuration information of the bearer or the data stream comprised the first indication information.

17. The method of claim 14, wherein the determining based on the pre-configured information of the bearer or the pre-configured information of the data stream comprises:

determining the state based on the bearer or attribute information of the data stream.

18. The method of claim 17, wherein the determining of the state based on the attribute information of the bearer or the attribute information of the data stream comprises:

determining the state based on at least one of data delay, a size of the data packet, and a sending time interval of the data packet.

* * * * *